US009674489B2

(12) United States Patent
Hazzani

(10) Patent No.: US 9,674,489 B2
(45) Date of Patent: Jun. 6, 2017

(54) SYSTEMS AND METHODS FOR LOCATION-BASED MULTIMEDIA

(75) Inventor: Gideon Hazzani, Rishon le Zion (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 1359 days.

(21) Appl. No.: 12/887,059

(22) Filed: Sep. 21, 2010

(65) Prior Publication Data

US 2011/0069172 A1 Mar. 24, 2011

(30) Foreign Application Priority Data

Sep. 23, 2009 (IL) .......................................... 201131

(51) Int. Cl.
| H04N 7/18 | (2006.01) |
| G08B 13/19 | (2006.01) |
| H04W 4/02 | (2009.01) |
| H04W 4/22 | (2009.01) |
| H04W 76/00 | (2009.01) |
| G08B 13/196 | (2006.01) |

(52) U.S. Cl.
CPC ....... *H04N 7/181* (2013.01); *G08B 13/19645* (2013.01); *G08B 13/19658* (2013.01); *H04W 4/02* (2013.01); *H04W 4/22* (2013.01); *H04W 76/007* (2013.01)

(58) Field of Classification Search
None
See application file for complete search history.

(56) References Cited

U.S. PATENT DOCUMENTS

| 7,324,824 | B2* | 1/2008 | Smith et al. ................ 455/456.1 |
| 7,363,028 | B2* | 4/2008 | de Clerq et al. ........... 455/414.1 |
| 7,379,729 | B2* | 5/2008 | Holland et al. ............ 455/404.2 |
| 7,421,321 | B2* | 9/2008 | Breed et al. ................. 701/33.6 |
| 8,081,738 | B2* | 12/2011 | Takeda et al. .................. 379/45 |
| 2003/0071122 | A1* | 4/2003 | Tsikos et al. ................. 235/454 |
| 2003/0203730 | A1* | 10/2003 | Wan et al. ................. 455/404.2 |
| 2004/0080624 | A1* | 4/2004 | Yuen ........................ 348/211.99 |

(Continued)

FOREIGN PATENT DOCUMENTS

| EP | 1353524 A1 | 10/2003 |
| WO | 2010116292 A2 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Reza Aghevli
(74) *Attorney, Agent, or Firm* — Meunier Carlin & Curfman

(57) ABSTRACT

Systems and methods for receiving location indications of a communication terminal engaged in a communication session with a communication network, and selecting from a plurality of cameras having different respective fields of view within a geographical region that contains the geographical location, at least one camera whose field of view covers the geographical location. Images are output of the geographical location captured during the session by the at least one selected camera. The images may be correlated with the location indications by a switch in the communication network.

15 Claims, 3 Drawing Sheets

(56) References Cited

U.S. PATENT DOCUMENTS

| | | | |
|---|---|---|---|
| 2005/0101334 A1* | 5/2005 | Brown et al. | 455/456.3 |
| 2006/0107296 A1* | 5/2006 | Mock et al. | 725/105 |
| 2007/0139182 A1* | 6/2007 | O'Connor et al. | 340/521 |
| 2008/0157940 A1* | 7/2008 | Breed et al. | 340/425.5 |
| 2008/0260111 A1 | 10/2008 | Takeda et al. | |
| 2009/0186596 A1* | 7/2009 | Kaltsukis | 455/404.2 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

Strobel, Daehyun, "IMSI Catcher," Seminararbeit Ruhr-Universitat Bochum, Chair for Communication Security, Prof. Dr.-Ing. Christof Paar, Jul. 13, 2007, 28 pages.

Meyer, Ulrike, et al., "On the Impact of GSM Encryption and Man-in-the-Middle Attacks on the Security of Interoperating GSM/UMTS Networks," IEEE, 2004, 8 pages.

Extended European Search Report, dated Dec. 29, 2010, received from the European Patent Office in connection with EP10178196.

\* cited by examiner

SYSTEMS AND METHODS FOR LOCATION-BASED MULTIMEDIA

CROSS-REFERENCE TO RELATED APPLICATION

This application claims priority to Israeli Patent Application 201131, filed Sep. 23, 2009, entitled "SYSTEMS AND METHODS FOR LOCATION-BASED MULTIMEDIA," which is incorporated herein by reference in its entirety.

FIELD OF THE DISCLOSURE

The present disclosure relates generally to communication systems and video surveillance, and particularly to methods and systems for combined video and communication monitoring.

BACKGROUND OF THE DISCLOSURE

Mobile communication networks deploy various techniques for measuring the geographical locations of wireless communication terminals. Such techniques are used, for example, for providing emergency services (e.g., "911" or "112" services) in cellular networks. Some location tracking techniques are based on passive probing of network events generated by the wireless terminals. Other techniques are active, i.e., proactively request the network or the terminal to provide location information.

Video surveillance systems are deployed and operated in various applications, such as airport security, crime prevention and access control. In a typical video surveillance application, multiple video cameras acquire video footage, which is viewed and/or recorded at a monitoring center.

SUMMARY OF THE DISCLOSURE

An embodiment that is described herein provides a method, including:
  receiving location indications, which indicate a geographical location of a communication terminal engaged in a communication session with a communication network;
  responsively to the location indications, selecting from a plurality of cameras, having different respective fields of view within a geographical region that contains the geographical location, at least one camera whose field of view covers the geographical location; and
  outputting images of the geographical location captured during the session by the at least one selected camera.

In some embodiments, outputting the images includes displaying the images to an operator. In an embodiment, the method includes outputting the geographical location concurrently with the images. In another embodiment, the method includes outputting audio content of the communication session concurrently with the images. In yet another embodiment, the method includes selecting a different camera responsively to a change in the geographical location of the communication terminal indicated by the location indications. Outputting the images may include correlating the images with the location indications. In a disclosed embodiment, correlation of the images with the location indications is performed by a switch in the communication network.

In some embodiments, outputting the images includes storing the images and the location indications jointly in a storage device at a first time, and retrieving and displaying the images and the location indications at a second time, later than the first time. In an embodiment, selecting the at least one camera includes querying a predefined mapping of geographical locations to image locations in the fields of views of the cameras. In another embodiment, selecting the at least one camera includes controlling the at least one camera so as to modify the field of view of the at least one camera responsively to the location indications.

In a disclosed embodiment, selecting the at least one camera includes automatically identifying an utterance of a Point Of Interest (POI) in audio content of the communication session, and estimating the geographical location based on the identified POI. In an embodiment, receiving the location indications includes accepting the location indications from the communication network.

There is additionally provided, in accordance with an embodiment that is described herein, a system, including:
  a first interface, which is configured to receive location indications that indicate a geographical location of a communication terminal engaged in a communication session with a communication network;
  a second interface, which is configured to interact with a surveillance subsystem including a plurality of cameras having different respective fields of view within a geographical region that contains the geographical location; and
  a processor, which is configured to cause the surveillance subsystem to select from the plurality of the cameras, responsively to the location indications, at least one camera whose field of view covers the geographical location, and to receive and output images of the geographical location captured during the session by the at least one selected camera.

There is also provided, in accordance with an embodiment that is described herein, a system, including:
  a surveillance subsystem including a plurality of cameras having different respective fields of view; and
  a correlation subsystem, which is configured to receive location indications that indicate a geographical location of a communication terminal engaged in a communication session with a communication network, to cause the surveillance subsystem to select from the plurality of the cameras, responsively to the location indications, at least one camera whose field of view covers the geographical location, to receive from the surveillance subsystem images of the geographical location captured during the session by the at least one selected camera, and to output the captured images.

The present disclosure will be more fully understood from the following detailed description of the embodiments thereof, taken together with the drawings in which:

DETAILED DESCRIPTION OF EMBODIMENTS

Overview

Various systems and applications act upon communication sessions occurring in a communication network. For example, in some countries emergency calls are forwarded to a dedicated call center, whose operators interact with the caller and dispatch emergency services. As another example, certain calls may be monitored by law enforcement agencies in order to track suspect individuals or activities. In many practical situations, the geographical area in which the caller is located (e.g., city or airport) is covered by multiple video cameras. Moreover, the communication network is often able to determine and report the geographical location of the caller (i.e., of the communication terminal used in the session).

Embodiments that are described herein provide methods and systems that use the above-mentioned video and location information for handling and acting upon communication sessions of interest. In some embodiments, a communication network produces location indications, which indicate the geographical location of a certain communication terminal that is engaged in a communication session of interest. A correlation system receives the location indications, and uses them to automatically select a video camera whose field of view covers the terminal's geographical location. The correlation system outputs video images of this geographical location, which were captured by the selected camera during the session.

In a typical system configuration, the video images of the terminal's location are displayed to an operator. In some embodiments, the system also displays the geographical location on a map and/or plays the audio content of the session, concurrently with the displayed images. In some embodiments, the correlation system updates the camera selection continually during the session, by processing up-to-date location indications arriving from the communication network. When the caller is in motion, the system may switch to a different camera automatically from time to time, attempting to provide the operator with a continuous view of the caller. Since camera selection is automatic, the operator is usually unaware of the actual camera from which the video is obtained.

Unlike some known solutions, the techniques described herein provide the operator not only with the audio of the communication session and a location indication, but also with real-time video footage of the caller's location. This consolidated view provides the operator with valuable information, which may also be used on-line or off-line for investigation or analysis, or as forensic evidence. In summary, the methods and systems described herein considerably enhance the ability of responsible authorities to handle emergency calls, gather information on suspect individuals and events, or otherwise act upon communication sessions of interest.

System Description

Figure 1:
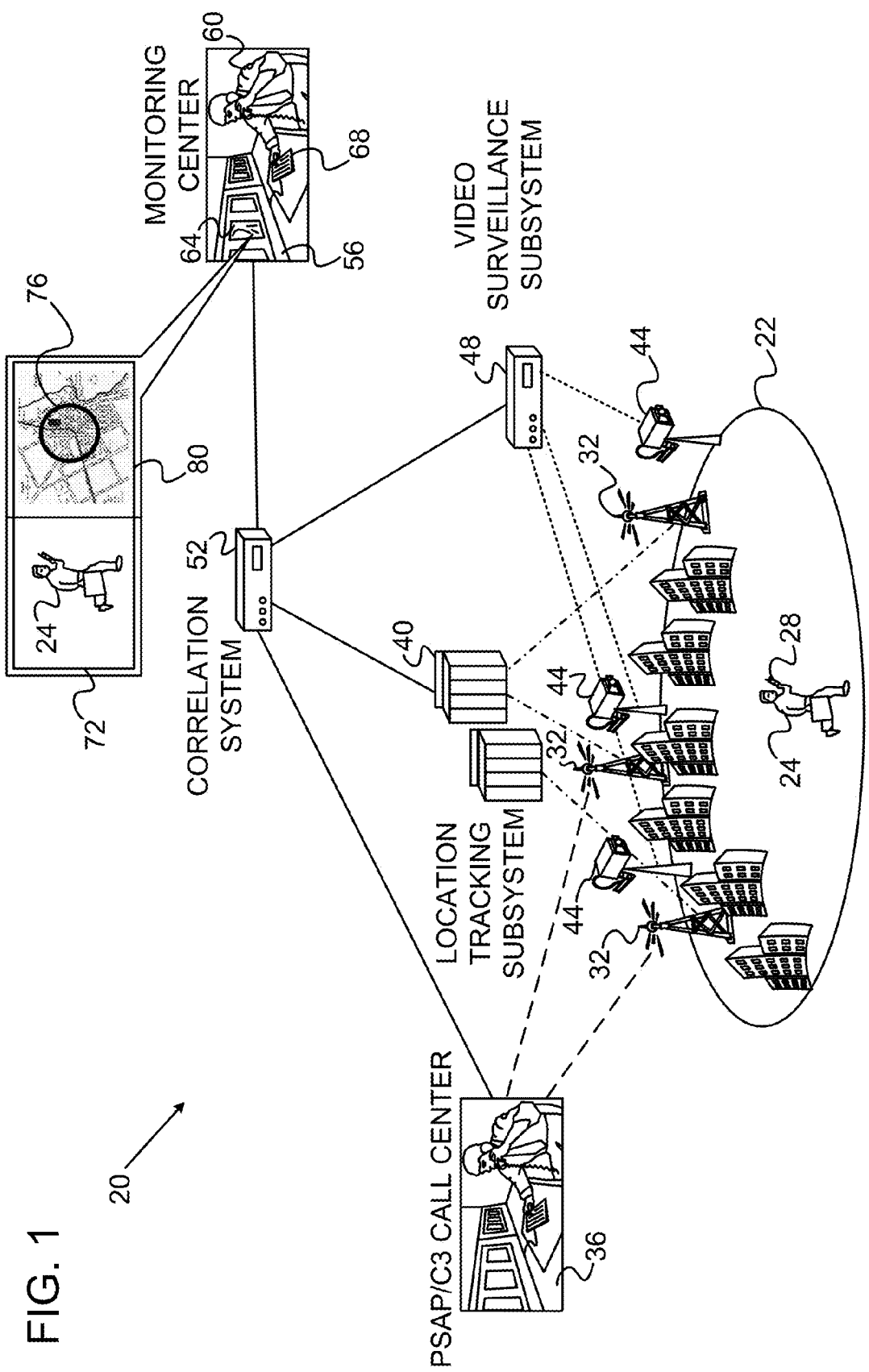
FIG. 1 is a schematic, pictorial illustration of a system for location-based multimedia monitoring, in accordance with an embodiment of the present disclosure.

FIG. 1 is a schematic, pictorial illustration of a system 20 for location-based multimedia monitoring, in accordance with an embodiment of the present disclosure. System 20 carries out tracking of selected communication sessions, combining location information, video images and/or audio content. In the example embodiment of FIG. 1, system 20 tracks emergency calls and is typically operated by a public safety or emergency services agency. In alternative embodiments, system 20 can be used by law enforcement agencies to track individuals or events of interest, such as in airport security systems, crime prevention systems or anti-terrorism systems. System 20 is deployed in a certain area of interest 22, which may comprise a city, city center, neighborhood, airport terminal or any other suitable area.

In system 20, users 24 communicate with a mobile communication network 32 by operating wireless communication terminals 28. Terminals 28 may comprise, for example, cellular phones, wireless-enabled computers or Personal Digital Assistants (PDAs), or any other suitable communication or computing device having wireless communication capabilities. Communication network 32 and terminals 28 may conform to any suitable communication standard or protocol, such as Long Term Evolution (LTE), Universal Mobile Telecommunication System (UMTS), CDMA2000 or other third generation (3G) cellular standard, Global System for Mobile communication (GSM) or Integrated Digital Enhanced Network (IDEN). Alternatively, the networks and terminals may conform to the IEEE 802.16 (WiMAX) standards or other wireless data standard. Although FIG. 1 shows only a single user for the sake of clarity, practical networks typically communicate with a large number of users and terminals. Although the description that follows refers to a single network, system 20 may operate with any desired number of networks, which may conform to different standards or protocols.

When a given user initiates an emergency call (e.g., a "911" call in North America or a "112" call in Western Europe), network 32 forwards the call to a Public Safety Answering Point (PSAP) 36. The PSAP comprises a call center that is dedicated to handling emergency calls. PSAP operators typically interact with the caller and dispatch emergency services as needed. In addition to forwarding the actual call to the PSAP, the communication network typically provides the PSAP with a location indication, e.g., an identity of the base station (cell) serving the emergency call. The PSAP may obtain additional information regarding the call from the communication network, such as the caller identity.

System 20 comprises a location tracking subsystem 40, which measures the geographical locations of wireless communication terminals 28 in area 22. The example of FIG. 1 refers to a single location tracking subsystem. Alternatively, the system may comprise two or more location tracking subsystems, which may be of different types. Location tracking subsystem 40 may apply any suitable location tracking technique available in the network, or a combination of such techniques, in order to measure terminal locations.

Some location tracking techniques, referred to as network-based techniques, are carried out by base stations 32 and other network-side components of the network, without necessarily using special hardware or software in terminals 28. Other location tracking techniques are terminal-based, i.e., use special hardware or software in wireless terminals 28. Terminal-based techniques may comprise, for example, techniques that use Global Navigation Satellite Systems (GNSS) such as GPS or GALILEO. The location tracking techniques may be passive or active. Passive techniques perform unobtrusive probing of the signaling information transmitted in the network, and extract location information from the monitored signaling. Active techniques, on the other hand, proactively request the network or the terminal to provide location information.

Some examples of location tracking techniques that can be used for this purpose are described in U.S. patent application Ser. No. 12/497,799, filed Jul. 6, 2009, which is assigned to the assignee of the present patent application and whose disclosure is incorporated herein by reference. Location tracking subsystem 40 measures the geographical locations of at least some of terminals 28, and produces location indications that indicate the measured terminal locations.

System 20 comprises a video surveillance subsystem 48, which comprises multiple video cameras 44. Each camera 44 has a certain field-of-view, which covers a particular sector in area 22. The cameras capture video images of their respective sectors and send the images to subsystem 48. Cameras 44 may have fixed fields-of-view. Alternatively, the cameras may comprise Pan-Tilt-Zoom (PTZ) cameras, whose fields-of-view are adjustable.

System 20 comprises a correlation system 52, which interacts with PSAP 36, location tracking subsystem 40 and video surveillance subsystem 48. The correlation system correlates the different types of information related to emergency calls, and produces a consolidated view of the calls using methods that are described in detail further below.

For a given emergency call made from a given terminal 28, correlation system 52 typically outputs (1) the geographical location of the terminal, (2) the audio content of the call, and (3) video images of the terminal's geographical location. The information is provided to a monitoring center 56, and displayed to an operator 60 using an output device such as a display 64. In the example of FIG. 1, operator 60 is presented with real-time video images 72 showing user 24 and his or her vicinity. In addition, an estimated geographical location 76 of user 24 is shown on an electronic map display 80. (The audio content is played to operator 60 using a suitable audio output device, e.g., a speaker or headset, not shown in the figure.) Operator 60 may control the display, request retrieval of previous calls or provide other input using an input device 68, such as a keyboard or mouse.

In alternative embodiments, any other suitable way of presenting the location, video and/or audio of the call can also be used. Additionally or alternatively to presenting the information to operator 60, correlation system 52 may store the information for later retrieval and analysis.

Figure 2:
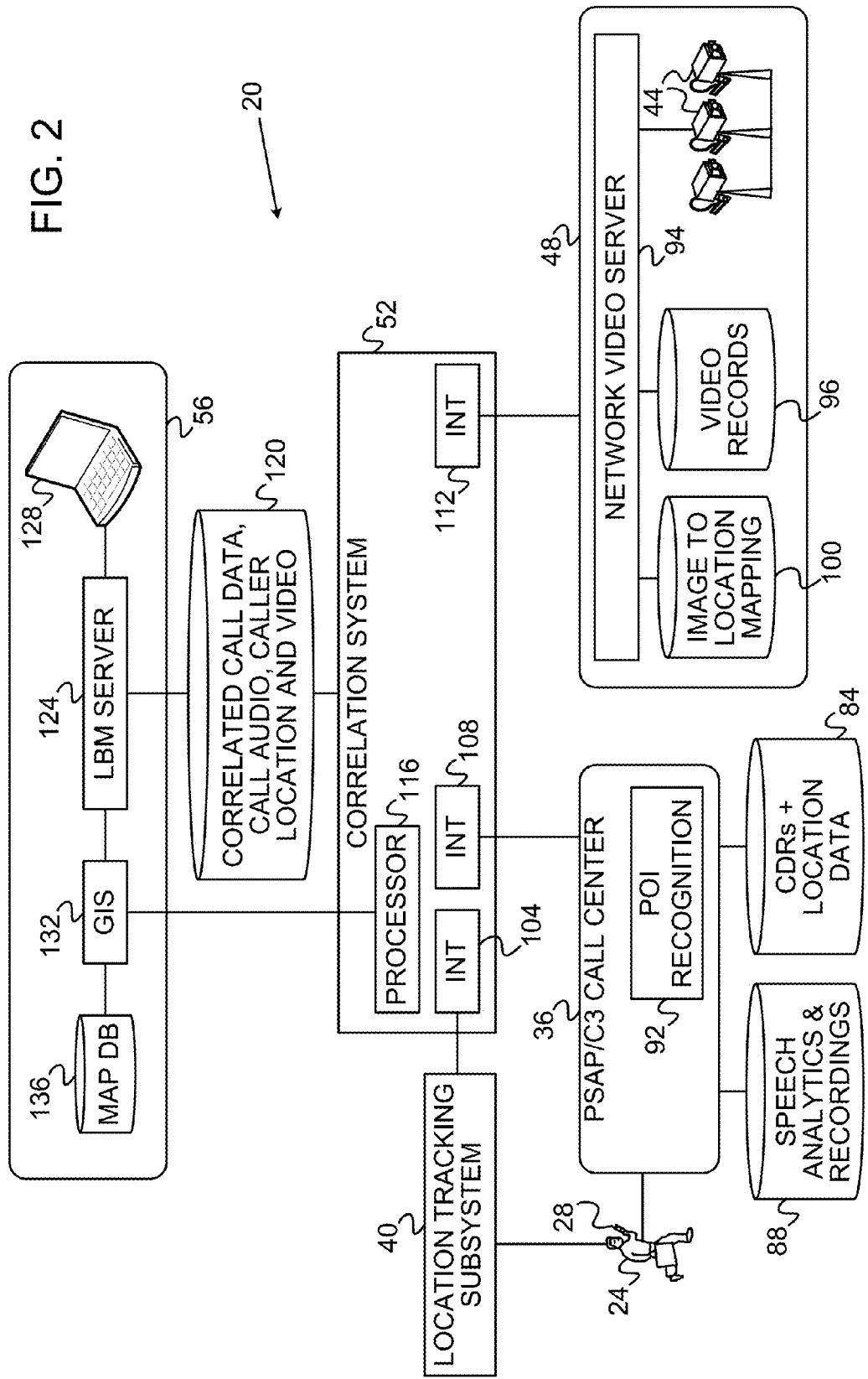
FIG. 2 is a block diagram that schematically illustrates a system for location-based multimedia monitoring, in accordance with an embodiment of the present disclosure.

FIG. 2 is a block diagram that schematically illustrates components of system 20, in accordance with an example embodiment of the present disclosure. In the example of FIG. 2, PSAP 36 stores Call Detail Records (CDRs) of emergency calls and the corresponding location indications in a CDR/location database 84. The PSAP stores the audio content of the calls in a speech database 88. In some embodiments, PSAP 36 comprises a Point-Of-Interest (POI) recognition engine 92, which automatically recognizes names of POIs that are referred to in the audio content of the call. The POI recognition process may be used to establish the caller's location with greater accuracy. This feature is addressed in greater detail further below.

Video surveillance subsystem 48 comprises a networked video server 94, which manages the operation of cameras 44, receives the video images captured by the cameras and sends the video to correlation system 52. Video server 94 stores captured video in a video records database 96 for off-line viewing and analysis. Subsystem 48 also comprises an image-to-location mapping database 100. Database 100 stores a predefined mapping of image coordinates to geographical coordinates for each camera 36. By querying this database with a certain geographical location, server 94 can determine which of cameras 44 has a field-of-view that covers this geographical location.

Correlation system 52 comprises interfaces 104, 108 and 112, for communicating with location tracking subsystem 40, PSAP 36 and video surveillance subsystem 48, respectively. System 52 further comprises a correlation processor 116, which carries out the correlation function described herein. In some embodiments, Correlation system 52 stores the multimedia views of emergency calls (e.g., call data, audio content, location information and video images) in a correlation database 120.

Monitoring center 56 comprises a Location-Based Monitoring (LBM) server 124, which accepts the multimedia information from correlation system 52 and presents it to operator 60 using an operator terminal 128. In the example of FIG. 2, LBM server 124 and correlation system 52 interact via database 120. In other words, system 52 stores the multimedia information in database 120, and sever 124 retrieves the information from database 120 in order to present it. In alternative embodiments, however, system 52 and server 124 may interact directly. In some embodiments, server 124 interacts with a Geographic Information System (GIS) 132, which provides map information and other geographic data for presentation purposes. The GIS may hold any suitable kind of geographic information, such as POIs, clutter data and blueprints of area 22. The geographic information is stored in a map database 136.

The configurations of FIGS. 1 and 2 are example configurations, which were selected purely for the sake of conceptual clarity. In alternative embodiments, any other suitable system configuration can also be used. For example, PSAP 36 and monitoring center 56 may be collocated, so that PSAP operators can use the consolidated view provided by correlation system 52. In some embodiments, some functions of correlation system 52 may be implemented as part of a switch, such as a Mobile Switching Center (MSC), of network 32.

The different databases in systems 20 (e.g., databases 84, 88, 96, 100, 120 and 136) may be implemented using any suitable data structures and storage devices. Typically, processor 116 and server 124 comprise general-purpose computers, which are programmed in software to carry out the functions described herein. The software may be downloaded to the computers in electronic form, over a network, for example, or it may, alternatively or additionally, be provided and/or stored on tangible media, such as magnetic, optical, or electronic memory.

Location-Based Monitoring Process Description

Figure 3:
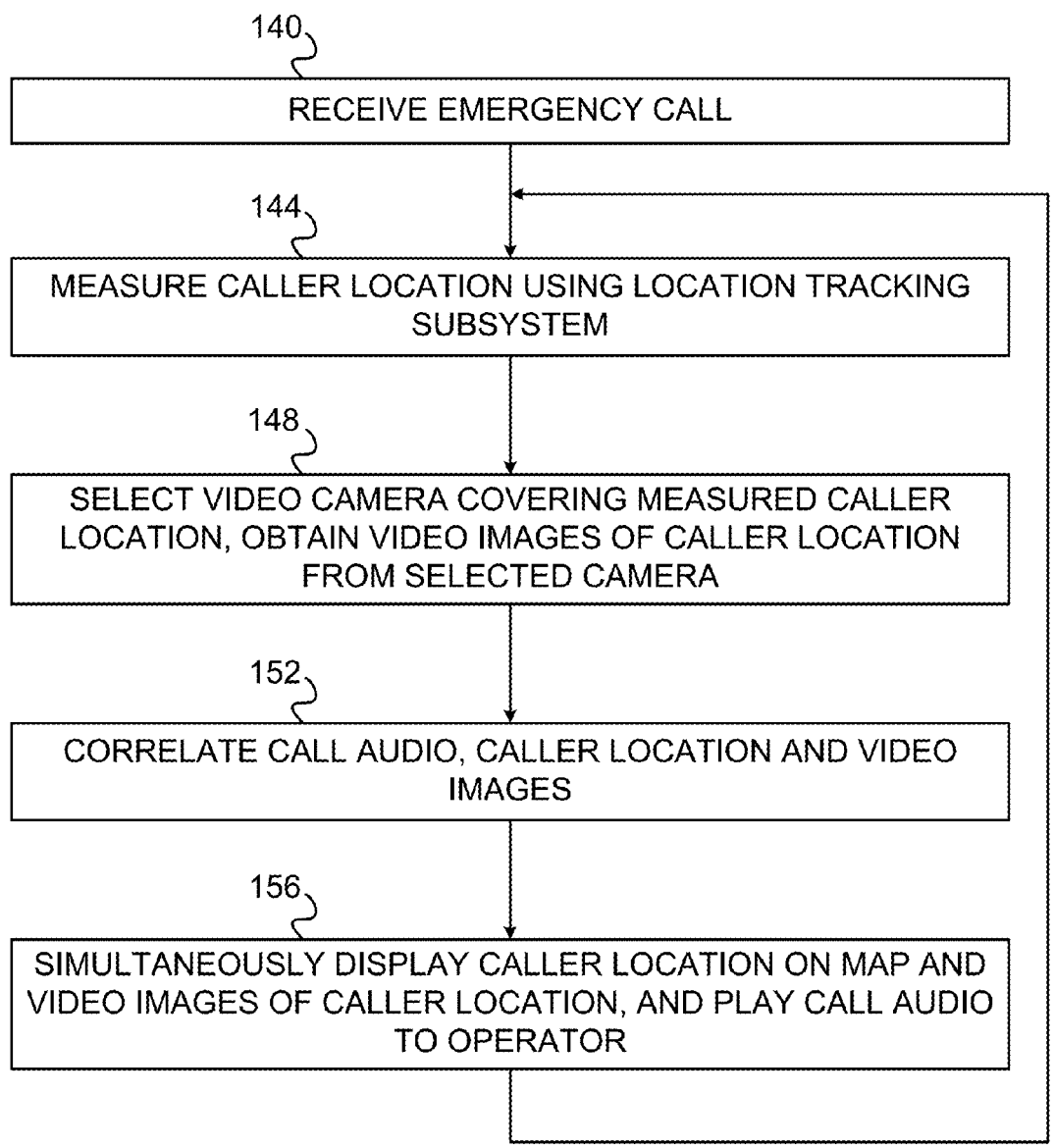
FIG. 3 is a flow chart that schematically illustrates a method for location-based multimedia monitoring, in accordance with an embodiment of the present disclosure.

FIG. 3 is a flow chart that schematically illustrates a method for location-based monitoring, in accordance with an embodiment of the present disclosure. The method begins with system 20 receiving an emergency call, at a call input step 140. The call is initiated by a user of a given terminal, referred to herein as a target terminal. Typically, network 32 forwards the emergency call to PSAP 36, and provides the PSAP with an estimated location of the caller and possibly additional data, e.g., the caller identity. PSAP 36 notifies correlation system 52 of the emergency call, and provides the correlation system with the call audio along with relevant information, such as the caller identity. In addition, the PSAP may store the call content and other data in databases 84 and 88 for off-line review.

Location tracking subsystem 40 measures the geographical location of the target terminal, at a location measurement step 144. Subsystem 40 produces location indications that indicate the terminal's location, and sends the location indications to correlation system 52. In some embodiments, system 52 actively requests subsystem 40 to provide location indications of the target terminal. In alternative embodiments, system 52 passively uses location indications that are sent by subsystem 40. In some embodiments, correlation system 52 may receive location indications from PSAP 36, either in addition to or instead of the location indications provided by subsystem 40. In the present context, the location indications are regarded as originating from the communication network, regardless of whether they are provided by PSAP 36 or by location tracking subsystem 40.

At this stage, correlation system 52 has established the estimated geographical location of the target terminal. The correlation system instructs video surveillance subsystem 48 to provide video images of the terminal's geographical location, at a video input step 148. Typically, correlation processor 116 provides video server 94 with the estimated terminal location. The video server identifies and selects at least one camera 44, whose field-of-view covers the terminal location provided by the correlation system. The video server typically identifies the appropriate camera by querying the predefined mapping of image coordinates to map coordinates stored in database 100. In the present example, the video server selects a single camera 44. Alternatively, when the estimated terminal location is covered by multiple cameras, the video server may select two or more cameras.

Video server 94 obtains video images from the selected camera (or cameras), and sends the images to correlation system 52. In some embodiments, the video server triggers the selected camera to capture the requested video footage. Alternatively, the cameras may operate irrespective of any request, and the video server selects the appropriate video images and sends them to system 52. In addition, the video server may store the captured video images in database 96 for off-line review.

Correlation system 52 correlates the call audio, location information and video images, at a correlation step 152. The correlation system typically produces a single data structure, which comprises the call audio, video images and location data. The correlation system synchronizes the audio, video and location elements to one another, i.e., brings them to a common time base, so that they can be presented and analyzed jointly. The correlation system typically stores the correlated information in database 120.

In some embodiments, correlation system 52 may perform various analytics operations on the call audio and/or the captured video. Such operations may involve, for example, identifying keywords of interest in the call audio, or identifying visual features of interest in the video images. The results of these analytics operation may comprise, for example, tags that indicate the identified features. In some embodiments, the correlation system stores the analytics results together with the correlated information in database 120.

LBM server 124 retrieves and presents the correlated information of the emergency call to operator 60, at a presentation step 156. Typically, the LBM server concurrently displays the video images, displays the target terminal's location on a map, and also plays the call audio. The LBM server may use GIS information provided by system 132 for this purpose.

In the present example, server 124 retrieves the information from database 120 in real-time or semi-real-time, i.e., during the call. Alternatively, however, server 124 may retrieve and present information regarding a call that occurred in the past, e.g., in response to a request from operator 60. When reviewing past calls in an off-line manner, the operator may use the analytics results stored by system 52, such as by navigating to tags that mark features of interest in the call audio or in the video images.

In many practical cases, the caller (and therefore the target terminal) is in motion during the emergency call. In some embodiments, system 20 continues to produce continuous video images of the target terminal's changing location, by processing up-to-date location indications provided by location tracking subsystem 40. In particular, correlation processor 116 continually updates the terminal location provided to video server 94. At a given point in time, server 94 may decide to switch to another camera 44, e.g., when the currently-used camera no longer covers the target terminal's location, or because another camera is expected to provide better coverage. Thus, when the user is in motion, the video server receives location estimates that change over time, and may modify the camera selection based on the current terminal location if needed. Additionally or alternatively to switching between cameras, the video server may adjust the field-of-view of the selected camera (e.g., steer or zoom) based on the estimated terminal location.

In some embodiments, POI recognition engine 92 in PSAP 36 automatically recognizes names of POIs that appear in the call audio. For example, the caller (or the opposite party) may refer to place names such as squares, buildings, intersections or other locations. If the geographical locations of these POIs are known a-priori, reference to such POIs may be helpful in determining or verifying the caller's location. In some embodiments, engine 92 applies suitable speech recognition techniques and attempts to identify references to known POIs in the call audio. Upon recognizing a POI, engine 92 reports the identified POI as part of the call data to the correlation system. The correlation system may use the identified POI in correlating the different call elements.

The embodiments described herein refer to monitoring of emergency calls. The methods and systems described herein, however, can be used in various other applications and with various other session types, such as video calls or text messaging. Moreover, the methods and systems described herein can be used with location indications that originate from various other devices, such as Radio Frequency Identification (RFID) tags or Automatic Vehicle Location (AVL) or Automatic Person Location (APL) transponders. Such devices are also regarded herein as kinds of communication terminals. The present patent application sometimes refers to the user of a target terminal as a "caller." This term, however, does not suggest that the user is necessarily the initiator of the call or session. The methods described herein can be used regardless of whether the session is initiated by the target terminal or not.

The methods and systems described herein are not limited to video cameras, and can be used with cameras that produce still images, as well. Although the embodiments described herein refer to networked video cameras that are controlled by a video server, the disclosed methods and systems can be implemented using autonomous cameras, as well.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   receiving location indications, which indicate a geographical location of a communication terminal engaged in a communication session with a communication network, wherein at least one of the location indications received is a Point Of Interest (POI) that has been automatically identified in an utterance in audio content of the communication session by a POI recognition engine;

responsively to the location indications, selecting from a plurality of cameras, having different respective fields of view within a geographical region that contains the geographical location, at least one camera whose field of view covers the geographical location; and outputting images of the geographical location captured during the session by the at least one selected camera, and displaying the geographical location on a map and playing audio content of the session, concurrently with displayed images.

2. The method according to claim 1, and comprising selecting a different camera responsively to a change in the geographical location of the communication terminal indicated by the location indications.

3. The method according to claim 1, wherein outputting the images comprises correlating the images with the location indications.

4. The method according to claim 3, wherein correlation of the images with the location indications is performed by a switch in the communication network.

5. The method according to claim 1, wherein outputting the images comprises storing the images and the location indications jointly in a storage device at a first time, and retrieving and displaying the images and the location indications at a second time, later than the first time.

6. The method according to claim 1, wherein selecting the at least one camera comprises querying a predefined mapping of geographical locations to image locations in the fields of views of the cameras.

7. The method according to claim 1, wherein selecting the at least one camera comprises controlling the at least one camera so as to modify the field of view of the at least one camera responsively to the location indications.

8. A system, comprising:
a first interface, which is configured to receive location indications that indicate a geographical location of a communication terminal engaged in a communication session with a communication network, wherein at least one of the location indications received is a Point Of Interest (POI) that has been automatically identified in an utterance in audio content of the communication session by a POI recognition engine;

a second interface, which is configured to interact with a surveillance subsystem comprising a plurality of cameras having different respective fields of view within a geographical region that contains the geographical location; and a processor, which is configured to cause the surveillance subsystem to select from the plurality of the cameras, responsively to the location indications, at least one camera whose field of view covers the geographical location, and to receive and output images of the geographical location captured during the session by the at least one selected camera, wherein the geographical location is displayed on a map and audio content of the session is played concurrently with the displayed images.

9. The system according to claim 8, wherein the processor is configured to cause the surveillance subsystem to select a different camera responsively to a change in the geographical location of the communication terminal indicated by the location indications.

10. The system according to claim 8, wherein the processor is configured to correlate the images with the location indications.

11. The system according to claim 10, wherein the processor is comprised in a switch in the communication network.

12. The system according to claim 8, and comprising a storage device, wherein the processor is configured to store the images and the location indications jointly in the storage device at a first time, so as to enable retrieval and display of the images and the location indications at a second time, later than the first time indications from the communication network.

13. A system, comprising:
a surveillance subsystem comprising a plurality of cameras having different respective fields of view; and a correlation subsystem, which is configured to receive location indications that indicate a geographical location of a communication terminal engaged in a communication session with a communication network, to cause the surveillance subsystem to select from the plurality of the cameras, responsively to the location indications, at least one camera whose field of view covers the geographical location, to receive from the surveillance subsystem images of the geographical location captured during the session by the at least one selected camera, and to output the captured images, wherein the geographical location is displayed on a map and audio content of the session is played concurrently with the displayed images, and wherein at least one of the location indications received is a Point Of Interest (POI) that has been automatically identified in an utterance in audio content of the communication session by a POI recognition engine.

14. The system according to claim 13, wherein the surveillance subsystem is configured to select the at least one camera by querying a predefined mapping of geographical locations to image locations in the fields of views of the cameras.

15. The system according to claim 13, wherein the surveillance subsystem is configured to control the at least one camera so as to modify the field of view of the at least one camera responsively to the location indications.

* * * * *